INVENTORS
LESTER FEINSTEIN
RONALD J. HRUBY

United States Patent Office

3,532,973
Patented Oct. 6, 1970

3,532,973
MICROWAVE FLAW DETECTOR
Lester Feinstein, Palo Alto, and Ronald J. Hruby, Campbell, Calif., assignors to the United States of America as represented by the Administrator of the National Aeronautics and Space Administration
Filed Mar. 20, 1968, Ser. No. 714,595
Int. Cl. G01r 27/04
U.S. Cl. 324—58.5          7 Claims

ABSTRACT OF THE DISCLOSURE

A flaw detecting system uses microwave energy radiated toward the surface to be tested and varying in a return-to-zero manner. The test surface modifies the reradiated pattern, and this modification is detected and correlated with an original reference pattern or with itself to determine the presence of flaws or irregularities in the surface.

---

The invention described herein was made by emloyees of the United States Government and may be manufactured and used by or for the Government for governmental purposes without the payment of any royalties thereon or therefore.

BACKGROUND OF THE INVENTION

Field of the invention

This invention relates in general to flaw detecting systems, and relates more particularly to such systems employing microwave energy.

Description of the prior art

There has been considerable activity over the years in flaw detection techniques for the study of fatigue or fracture characteristics of materials in both the field and laboratory, and a number of different methods have been used in this work. For example, ultrasonic methods of crack detection have been widely used, but they require that the generating and detecting apparatus be in contact with the specimen to be tested. Magnetic methods have also been employed, but they are limited to ferro-electric materials, thus eliminating their use in a number of areas. Electrical methods are also used, but they require good electrical contact to the specimens where a resistance change is measured or require search coils where impedance change is measured. Very high resolution optical methods have also been developed, but they generally require the removal of the specimen from the test position and a very careful measurement under a magnifying system. Thus, all of the prior art flaw detection systems have one or more shortcomings which limit their applicability in a wide variety of circumstances.

SUMMARY OF THE INVENTION

In accordance with the present invention, there is provided a flaw detection system utilizing microwave energy which is radiated to the test surface and which varies in a cyclic or return-to-zero manner. The test surface modifies the reflected electromagnetic energy, in accordance with the surface condition, so that the reflected energy provides a measure of the surface condition as a function of the cyclic scan angle. This reflected energy is demodulated and then correlated, either with itself or with a reference pattern, to provide an indication of irregularities in the surface.

In the preferred form of the invention, the return-to-zero signal is produced by a modulator which provides a cyclically varying electromagnetic signal for radiation to the test surface. The energy of the microwave source and the size of the irradiating aperture are preferably adjusted so that the distance from the aperture to the test surface falls within the Fresnel diffraction zone for local testing, thus maintaining the test area substantially constant for small variations in the aperture-to-test surface spacing. Thus, the system can be made essentially independent of small variations in this latter spacing.

An additional (but not essential) feature of the invention is the use of a phase and amplitude compensating network to reduce or eliminate the effects on the demodulator of variations in the spacing between the aperture and the specimen. This compensating network samples the signal from the demodulator and adjusts the phase and amplitude of a reference signal supplied to this detector to maintain the standing wave across it at a minimum value.

A further feature of this invention is the use of a continuous loop, variable speed, separate record and playback magnetic tape recorder for use in correlation of the detected signals. The detected signal is recorded on this recorder, and correlation may be performed either with a reference pattern recorded on the recorder or by auto or cross correlation techniques using the detected signal itself.

It is therefore an object of the present invention to provide an improved flaw detection system employing microwave energy.

It is a further object of this invention to provide a flaw detection system employing the radiation at a test surface of microwave energy which varies in a return-to-zero manner and the detecting of reflected energy from the test surface to indicate irregularities therein.

It is an additional object of the present invention to provide a flaw detection system utilizing microwave energy which varies in a return-to-zero manner to irradiate a test specimen, the reflected energy from the specimen being detected and correlated to indicate irregularities in the surface of the specimen.

BRIEF DESCRIPTION OF THE DRAWINGS

Objects and advantages other than those set forth above will be apparent from the following description when read in connection with the accompanying darwings, in which.

DESCRIPTION OF THE PREFERRED EMBODIMENT

Prior to discussing the details of the invention, the following general considerations will be presented as an aid to understanding the invention. The basic theory of a microwave metal surface flaw detector is that irradiation of a flawed metal surface by electromagnetic microwave energy results in re-emission of electromagnetic energy from the surface in a pattern of eigenmodes different from those of the original irradiating signal. The incident microwave signal must satisfy the electromagnetic boundary conditions on the surface of the specimen. These boundary conditions require that the tangential component of the electric field intensity be continuous and that the normal components of the magnetic flux density be continuous across the boundary. This means that the incident electric and magnetic field induce surface charges on the test specimen which then oscillate at the same frequency as the incident microwave signal. The actual pattern of the surface charges is determined both by the incident field configuration and the topography of the specimen.

The oscillation of the surface charges produces an electromagnetic wave traveling away from the test specimen and having a spatial patterns uniquely related to the surface currents which are governed by the topography of the surface. When the surface is plane, the reradiated field can only be resolved into components of the original incident wave. When the surface is complex or contains a surface fault, e.g., crack, the reradiated wave is also more complex and contains higher order electric and/or magnetic eigenmodes.

The reradiated energy would then constitute a collection of eigenmodes whose energy distribution, by virtue of the reel to satisfy the flaw boundary conditions, would be a signature of the surface crack. By measuring this energy distribution, the surface flaw can be analyzed. The type of microwave system employed may be either a standing wave system or a traveling wave system. In the standing wave system, an electromagnetic wave is reflected from a test surface, producing a standing wave in the eigenmodes corresponding to the flaw signature of an enclosed microwave circuit. This type of system is characterized by a voltage standing wave ratio which approaches infinity for a no-loss system. A traveling wave system is one in which a microwave source launches a traveling wave which illuminates the test object, and the test object reradiates some of the incident energy in the other appreciable eigenmodes. A microwave detector system receives the reradiated energy and, by measuring the energy distribution in the eigenmodes, the nature of the surface flaw in the test object can be determined.

Figure 1:
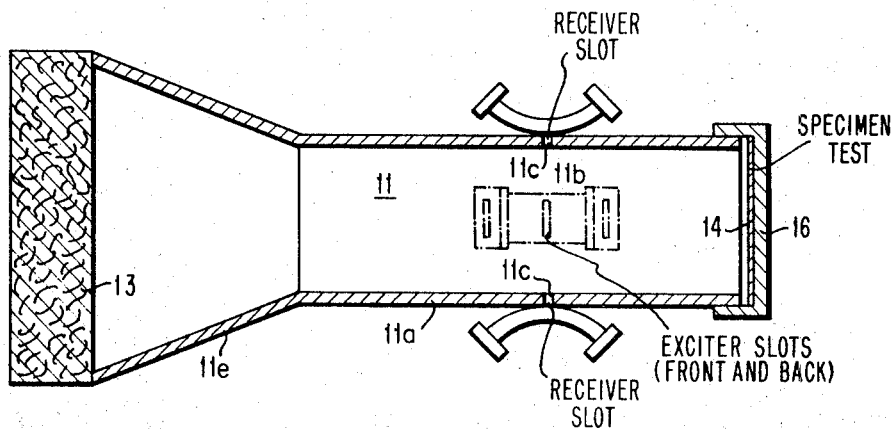
FIG. 1 is a schematic diagram of test apparatus used to obtain preliminary data in accordance with the present invention.

A series of specific experiments was carried out to establish the validity and order of senstivity of the approach of this invention for metal surface crack detection. The system utilized for this purpose is the standing wave system shown in FIG. 1. In that system, the interrogating signal is fed to the center of the waveguide and the test surface acts as a transverse waveguide short with the flaw acting as a perturbation. The structure of the system is shown in FIG. 1 and includes a waveguide member 11 having a cylindrical portion 11a. Microwave energy is supplied to this member through a pair of opposed exciter slots 11b (only one of which appears in FIG. 1) which are located on both the front and back of the waveguide. The cylindrical portion of the waveguide is also provided with a pair of spaced opposed receiver slots 11c which receive reflected energy and transmit it to suitable detecting apparatus (not shown).

The waveguide member is also provided with a horn portion 11e extending from one end of cylindrical portion 11a and terminating in a thickness of microwave energy-absorbent material 13. At the opposite end of the waveguide member is located a test specimen 14 which is to be examined for flaws. The specimen 14 may be mounted in a holder 16 which is rotatable about the axis of the waveguide.

The excited slots 11b are so arranged that they introduce the fundamental cylindrical $TE_{11}$ mode in the cylinder section which radiates the test surface in the $+Z$ direction, and the energy which propagates in the $-Z$ direction is absorbed through matching born section 11e and absorbent material 13. The test surface 14 is set at a distance from the receiver slots 11c which provides maximum coupling to them for higher order transverse magnetic modes.

If the surface flaw has depth, higher order modes will be generated, and if the receiving slots are properly phased together, the resultant signal at the detector assembly will provide the monitor signal for the higher order modes from the surface crack. It will be understood that this is not a measurement of complex impedance at a transmission line discontinuity; rather, it is the measurement of higher mode generation. The $TE_{11}$ wave traveling in the $+Z$ direction irradiates the test surface and is reflected back to the absorbing medium. Consequently, there is a standing wave in the fundamental electric $TE_{11}$ mode, but in theory, no standing wave in the higher order magnetic modes. In practice, internal imperfections in other parts of the system are generally sufficient to cause internal reflections which require that the receiving slots 11c, which were tuned for higher order modes only, be placed at a compatible distance from the test surface.

The object of the preliminary tests was to determine the system sensitivity to surface cracks. To accomplish this, the test specimens 14 were in the form of discs with polished surfaces and unsymmetrically placed grooves whose depths and widths were previously measured accurately. As far as the micowave system was concerned, a groove appeared the same as a crack and provided a means of working with flaws of known dimensions.

The grooves, which were essentially wedge-shaped in cross section, were approximately 0.003 in. wide, 0.8 in. long, and of different depths. The experimental data were generated by two higher order magnitude modes, the $TM_{11}$ and the $TM_{21}$. These magnetic modes correspond to two current loops and four current loops, respectively, in the test surface. A crack placed in the center of the test surface will not produce a signal because the components from the individual loops cancel each other.

Figure 2:
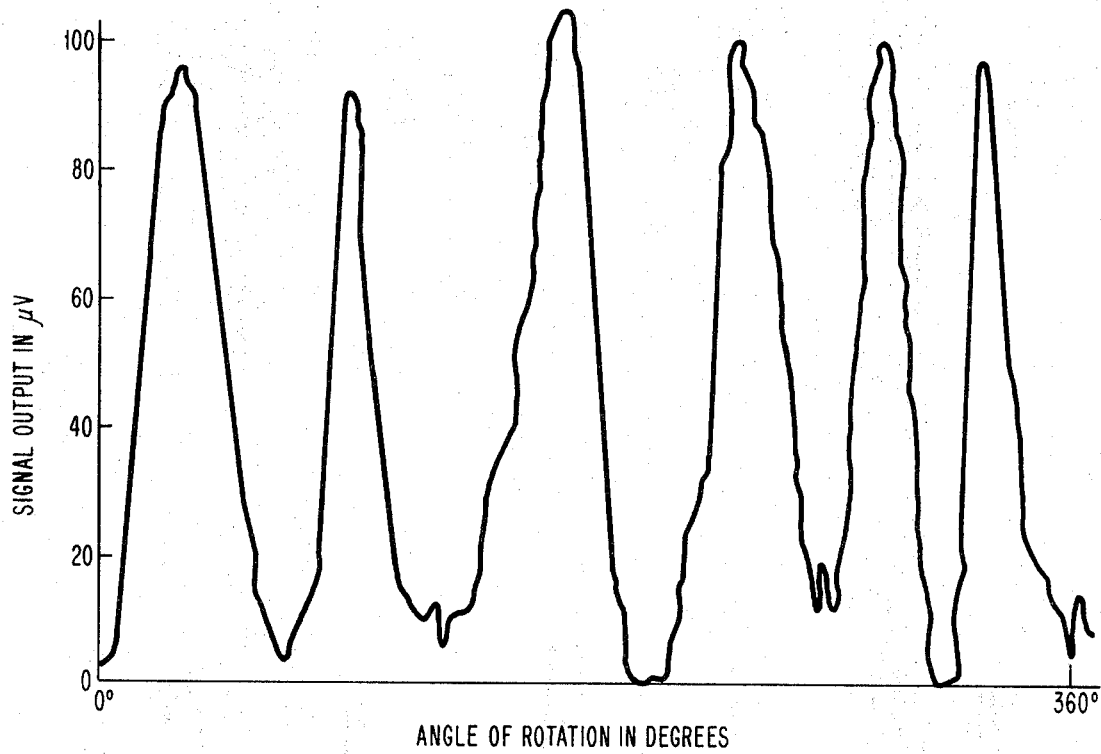
FIG. 2 is a graph of signal output as a function of the degree of rotation of the test specimen in the apparatus of FIG. 1.

The graph of FIG. 2 is a representative output signal of the microwave test system used to detect the grooves. The variation in output was generated by rotating the unsymmetrical crack samples through 360 degrees, and the presence of specific eigenmodes was inferred from the number of signal peaks per complete revolution or rotation. It was common to find six peaks on each of the data plots, and this was probably due to a combination of a $TM_{21}$ and a $TM_{11}$ mixture, since the frequency employed was too low for a propagating $TM_3$ mode.

The method of selecting the operating frequency consisted of sweeping the microwave range while rotating a sample with an 0.8 in. long by 0.030 in. deep groove. The correct operating frequency was indicated by a zero DC level and a signal response to rotation of the groove which established the reference signal level. The tuning of the microwave circuits was then performed at this frequency. As an alternate procedure, the optimum operating eigenmode may be selected and the microwave frequency adjusted to suit it.

Figure 3:
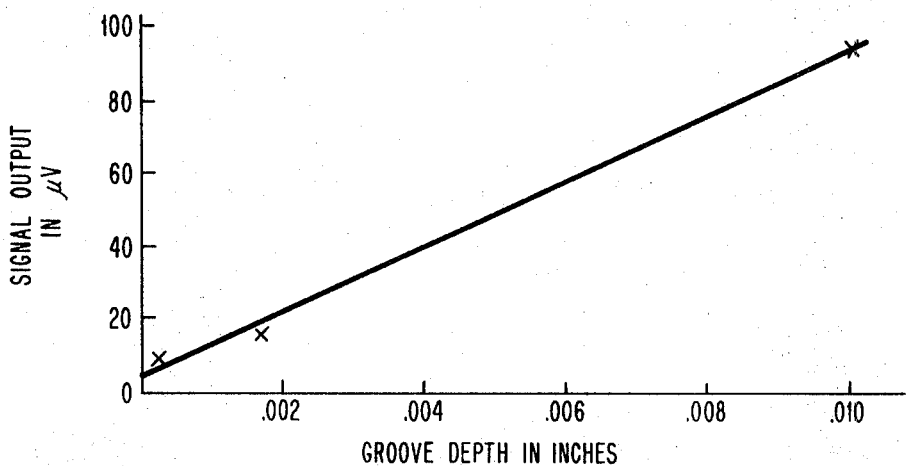
FIG. 3 is a graph showing variations in signal output for different depths of grooves detected in accordance with this invention.

The groove detecting system was set up for operation at a frequency of 15.965 gHz. with the $TE_{11}$ mode. Output signals of the 0.010 in. deep by 0.8 in. long groove had an average peak-to-peak value of 95 microvolts, as shown in FIG. 2. The 0.0015 in. deep by 0.8 in. long groove had an average peak-to-peak signal value of 15.6 microvolts, and the average output levels for scratches or grooves on the order of 100 microinches deep by 0.8 in. long were 6 microvolts peak-to-peak. The irregularities in the signal of FIG. 2 are due to the fact that the specimen was rotated by hand and hence, nonuniformly. FIG. 3 is a plot showing the approximate variation of output with groove depth.

A set of experiments were conducted to evaluate the detectability of signals for actual fatigue cracks. Single-notch magnesium tensile specimens with fatigue cracks approximately ⅛ in. long, and some without fatigue cracks, were used in the same microwave system used for the experiments described above. The specimens were modified to fit on a circular holder so that two specimens were mounted symmetrically about an axis of the disc with the notches facing radially outward on a common diameter.

Figure 4A:
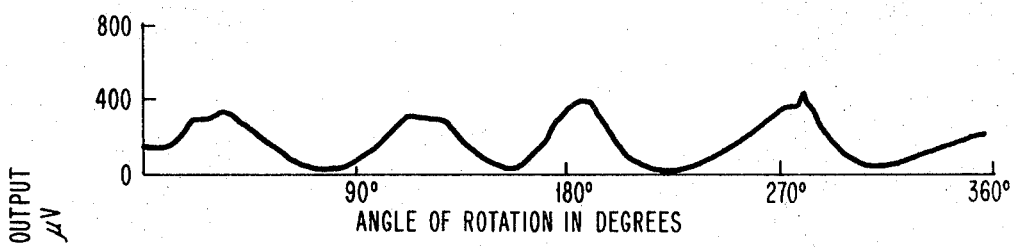
FIGS. 4A, 4B and 4C are graphs showing variations in signal output as a function of angle of rotation of different test specimens.
Figure 4B:
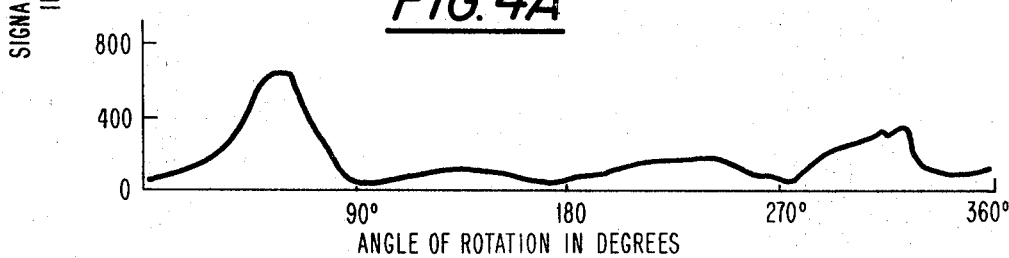
Figure 4C:
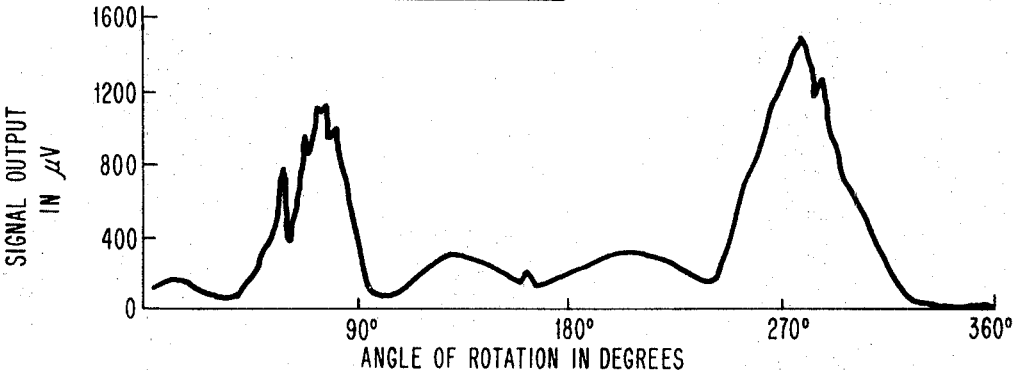

Compared to the notches, the fatigue cracks were quite small (approximately 1/16 in. by 1/8 in., with a maximum width of 50 microinches) so that it was necessary to resort to a special configuration to provide adequate crack detection sensitivity. Output signals were measured for the cases where there were no fatigue cracks in the notch specimens, where there was only one specimen with a fatigue crack and the other just notched, and where both specimens had fatigue cracks. The graph of FIG. 4A shows the signal for the arrangement with no fatigue crack. The interfaces between the sample holder and the sample acted as grooves and because of slight asymmetry gave the four eigenmode cycles shown. In the graph of FIG. 4B, the signal from the one crack specimen has interacted 180 degrees out of phase with the two center signal maxima so that its net effect is to decrease their signal strengths. In the graph of FIG. 4C, the added signal from the second crack has interacted in phase with the outer two signal maxima to increase their signal strengths and provide the signal shown.

Figure 5:
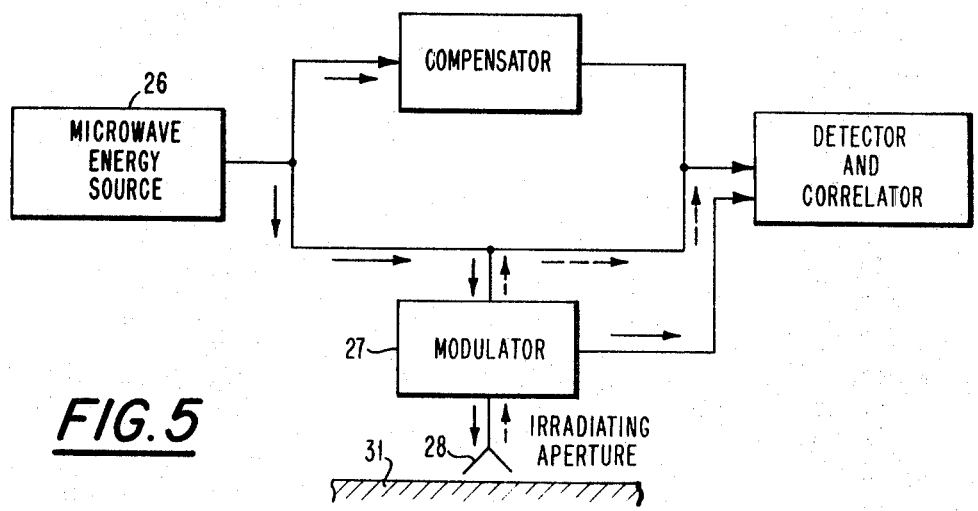
FIG. 5 is a schematic diagram of apparatus for carrying out the present invention.

The principles of the present invention may be carried out utilizing equipment shown schematically in FIG. 5. The apparatus includes a source of microwave energy 26 which supplies energy to a modulator 27. Modulator 27 is connected to an irradiating aperture 28 and may be of any suitable type capable of generating a return-to-zero signal so that the electromagnetic pattern on the test surface changes systematically, always returning to the original starting point after each cycle. The modulator may be a Faraday polarizing filter which rotates the electromagnetic pattern in a cylindrical waveguide through 180 degrees twice or 360 degrees. In this case, the irradiating aperture 28 would be a circular horn. Alternatively, the modulator could comprise a periodically driven phase shifter which produces a cyclic ±180 degree variation. In general, any return-to-zero modulator system which varies the radiated electromagnetic pattern in a prescribed cyclic manner for correlation purposes would be suitable.

Energy from modulator 27 is thus supplied to irradiating aperture 28 and the radiated energy from this aperture is directed at the surface of the test specimen 31. It is important that the operating wavelength of the microwave source and the size of the irradiating aperture be adjusted so that the required distance to the test surface falls within the Fresnel diffraction zone for local testing. If the test surface falls in the Fraunhofer region, the size of the test area will vary for different sample-to-aperture distances, and this is difficult to analyze. However, if only Fresnel diffraction is involved, small changes in the sample-to-aperture distance do not change the size of the test area, thus facilitating correlation.

The surface of test specimen 31 modulates the electromagnetic pattern radiated by aperture 28, and this modulation pattern of eigenmodes is different for each type of surface property. The modulated energy pattern (represented by the broken arrows) is supplied to a detector and correlator 32 where it is detected and correlated. This comparison may be made by any suitable means which compares the detected signal with a recorded reference pattern or itself. Auto or cross correlation apparatus may be employed. The signal from the modulator enables the playback of the recorded pattern to be synchronized with the detected signal. The important point is that by utilizing a return-to-zero signal in the system, such correlation is possible so that surface discontinuities may be readily detected.

Figure 6:
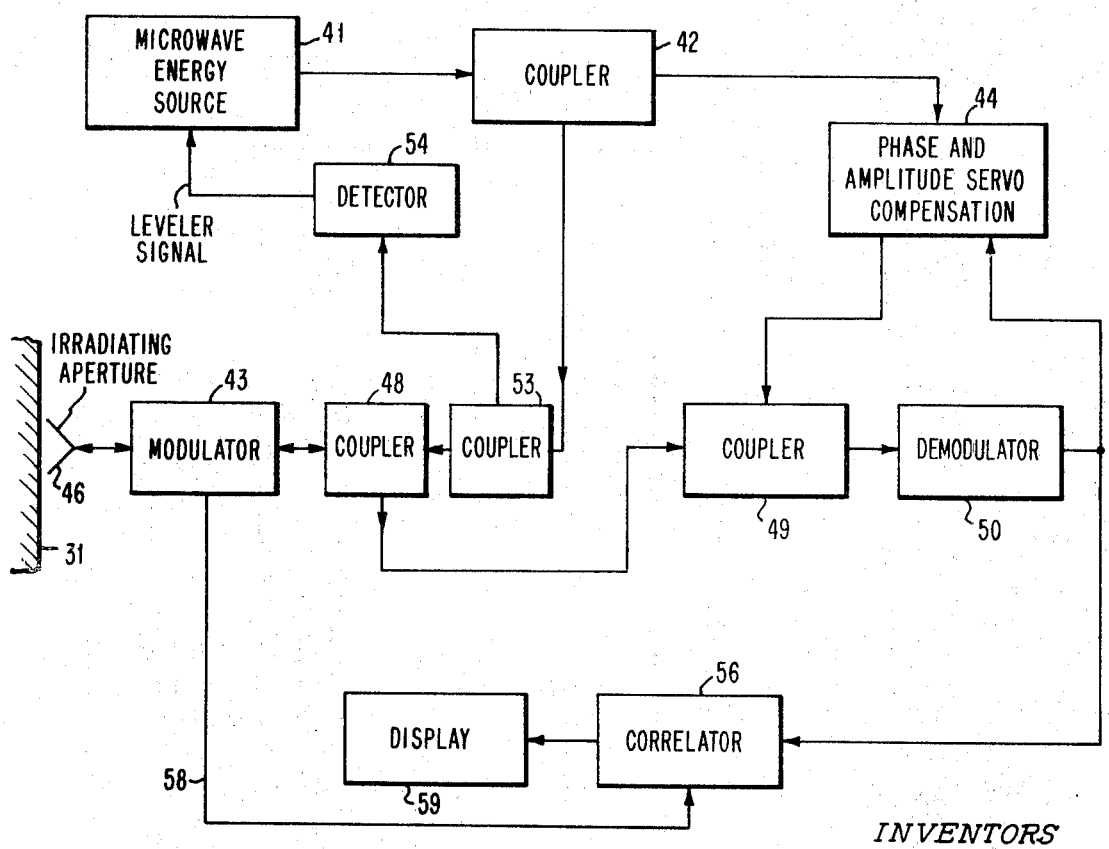
FIG. 6 is a schematic diagram of apparatus for carrying out the present invention utilizing phase and amplitude compensation.

FIG. 6 illustrates apparatus for carrying out the present invention utilizing more refined correlation and compensation techniques. In FIG. 6, a source of microwave energy 41 supplies energy through a directional coupler 42 to a modulator 43. A portion of the energy through coupler 42 is supplied to a phase and amplitude servo compensator 44, for a purpose which will be described more in detail below. Modulator 43 may be of any suitable type, such as the Faraday polarizing filter or the periodically driven phase shifter discussed above, which is operable to generate a return-to-zero signal. This signal is supplied to an irradiating aperture 46 which is positioned to irradiate the test surface 31 with electromagnetic energy.

The reflected energy from surface 31 returns through aperture 46 and modulator 43 to a directional coupler 48 which separates this reflected signal and supplies it to a summing point across directional coupler 49. This reflected signal is summed in directional coupler 49 with the output from the phase and amplitude servo compensator 44 and fed to demodulator 50. Compensator 44 is a network which functions to adjust the microwave circuit so that the standing wave appearing across demodulator 50 is kept to a minimum, regardless of the actual separation distance between irradiating aperture 46 and test surface 31.

As indicated above, compensator 44 receives an input from microwave source 41, and it also receives a control input from the output of demodulator 50. Compensator 44 contains controllable phase shifting means and controllable attenuation means to modify the phase and amplitude, respectively, of the microwave energy from source 41 in response to the signal from demodulator 50 so that the output signal supplied to coupler 49 by compensator 44 varies in a manner to keep the standing wave across demodulator 50 at a minimum, regardless of variations in spacing between aperture 46 and surface 31.

The system of FIG. 6 includes a directional coupler 53 which samples a portion of the microwave source energy output and supplies it to a detector 54. The output from detector 54 is supplied back to microwave source 41 for signal levelling purposes, in accordance with techniques well-known in the art.

The system of FIG. 6 also includes a correlation device or network indicated at 56. Correlator 56 receives an input from demodulator 50 which represents the reflected signal from the test surface, and this signal is correlated to facilitate detection of changes in the properties of surface 31. Such correlation may be performed either with an inserted reference pattern or by auto or cross-correlation with the reflected signal itself. Such correlation techniques are well-known in the art, and the details are not set forth here. However, many such techniques are described in an article entitled "Correlation Entering New Fields With Real-Time Signal Analysis" appearing in the Oct. 31, 1966 issue of Electronics.

Correlator 56 may include a continuous loop, variable speed dual record and playback magnetic tape recorder. The recorder may be used to provide the delay for auto or cross correlation and/or it may be used for recording and playing back a reference pattern signal. Connection 58 provides a synchronizing signal to the correlator 56 so that the playback of the recorded reference pattern signal will be in the proper phase with the detected signal. The time delay in the correlator may vary from $10^{-5}$ seconds up to 100 milliseconds to accommodate a frequency range in modulator 43 from 100 Hz. to 5000 Hz. The output from correlator 56 may be supplied to a suitable display network device 59 for providing a display and/or record of the correlated signals. The reference pattern signal and the detected signal may be cross correlated or fed directly to display 59 for visual comparison.

In general, correlator 56 and modulator 43 operate at a very high frequency so that the motion of aperture 46 relative to surface 31, or the operation of compensator 44, do not affect them. Preferably, the frequency of the servo loop in compensator 44 is kept below 20 c.p.s. to prevent interaction between compensator 44 and correlator 56, but this frequency is also less than an order of magnitude below the frequency of modulator 43.

Thus, there is provided a crack detection system which responds only to those discontinuities which occur in the surface layer of specimen 31 to within a multiple of the thickness of the skin depth because of the wavelength of the electromagnetic signal.

The system of this invention requires no contact with the tested surface and results in non-destructive testing, as well as non-focused and non-directive interrogation of the sample surface. A system such as shown in FIG. 6 can be made portable so that it can be readily carried by hand while walking over a surface to be tested. Further, the correlation techniques used can be adjusted to any type of surface discontinuity under study, thus lending the invention to use in a wide variety of circumstances.

As an alternate embodiment of the invention, if the sample surface is in the form of a notched tensile fatigue sample, then modulator 43 is not required since the cyclic application of the tensile force to the sample in the testing apparatus provides an adequate return-to-zero signal. Additionally, if the test surface oscillates during the test, modulator 43 may not be required since such oscillation can provide the desired return-to-zero signal if the surface oscillation is appropriate.

What is claimed is:

1. Apparatus for detecting flaws in a test surface, comprising:
   a source of microwave energy having a specific eigenmode;
   an irradiating aperture adapted to be disposed adjacent the test surface;
   means coupling said energy source to said aperture to irradiate the test surface with microwave energy;
   means for modulating in a cyclic manner the microwave energy impinging on said surface; and
   demodulating means coupled to said aperture for measuring the energy reflected from said surface distributed in eigenmodes other than said incident eigenmode, said reflected energy being a function of said flaws in said test surface.

2. Apparatus in accordance with claim 1 in which said modulating means comprises a microwave energy modulator connected between said source and said aperture to spatially modulate the energy supplied to said aperture.

3. Apparatus in accordance with claim 1 in which said modulating means comprises means for producing a cyclic motion of said test surface.

4. Apparatus in accordance with claim 2 including a phase and amplitude compensator connected between said source of microwave energy and said demodulating means, said compensator adjusting the phase and amplitude of the microwave signal across said demodulating means to maintain the standing wave thereacross at a minimum regardless of variations in spacing between said aperture and the test surface.

5. Apparatus in accordance with claim 2 including correlating means connected to said demodulating means, said correlating means including recording means for recording a signal from said demodulating means and for correlating said recorded signal to provide an indication of flaws in said surface.

6. Apparatus in accordance with claim 5 wherein said correlating means includes means for comparing a signal from said demodulating means with a reference signal indicative of a standard test surface.

7. Apparatus in accordance with claim 2 in which the wavelength of said microwave energy source and the size of said aperture are selected so that the distance between said surface and said aperture falls within Fresnel diffraction zone, to thereby minimize the effects of small variations in said distance between said aperture and said surface.

References Cited

UNITED STATES PATENTS 2,596,529  5/1952  Clarke.
3,025,463  3/1962  Luoma et al.

RUDOLPH V. ROLINEC, Primary Examiner

M. J. LYNCH, Assistant Examiner